United States Patent

Kossner

[11] Patent Number: 6,149,421
[45] Date of Patent: Nov. 21, 2000

[54] DEVICE FOR PRODUCING CROSS-FINNED PIPES

[75] Inventor: Huber Kossner, Schwanfeld, Germany

[73] Assignee: Unicor GmbH Rahn Plastmaschinen, Germany

[21] Appl. No.: 09/341,012

[22] PCT Filed: Jan. 14, 1998

[86] PCT No.: PCT/DE98/00130

§ 371 Date: Jun. 29, 1999

§ 102(e) Date: Jun. 29, 1999

[87] PCT Pub. No.: WO98/32585

PCT Pub. Date: Jul. 30, 1998

[30] Foreign Application Priority Data

Jan. 25, 1997 [DE] Germany ............... 197 02 637

[51] Int. Cl.[7] .................................................. B29C 49/00
[52] U.S. Cl. ................... 425/233; 425/326.1; 425/336; 425/384; 425/388; 425/392; 425/396
[58] Field of Search .................... 425/144, 149, 425/325, 336, 392, 396, 532, 539, 107, 233, 326.1, 384, 388; 264/209.3, 286, 508

[56] References Cited

U.S. PATENT DOCUMENTS

| | | | |
|---|---|---|---|
| 3,981,663 | 9/1976 | Lupke | 425/326.1 |
| 4,492,551 | 1/1985 | Hegler et al. | 425/144 |
| 5,257,924 | 11/1993 | Dickhut et al. | 425/326.1 |

FOREIGN PATENT DOCUMENTS

| | | |
|---|---|---|
| 0065729 | 12/1982 | European Pat. Off. |
| 2065048 | 6/1972 | Germany |
| 2753297 | 6/1978 | Germany |

*Primary Examiner*—Harold Pyon
*Assistant Examiner*—Donald Heckenberg
*Attorney, Agent, or Firm*—Bachman & LaPointe, P.C.

[57] ABSTRACT

Described is an apparatus for the production of transversely ribbed tubes, having mold jaw halves which bear against each other along a common mold section with front faces, and form a mold passage. Each mold jaw half is connected at a surface to a support element. The support elements are guided along a first linear guide device. A guide and slide element is fixed to a second surface of each mold jaw half. The guide and slide elements are guided along a second linear guide device. The support elements and the guide and slide elements comprise the same material. The mold jaw halves comprise a material of relatively low specific weight and a coefficient of thermal expansion ($\alpha_B$) which is high in comparison with the coefficient of thermal expansion ($\alpha_A$) of the material for the support elements and the guide and slide elements. In order nonetheless to insure close contact of the mold jaw halves, in the direction of the mold section they are of a longitudinal extent (B) which, at the operating temperature (T) of the mould jaw halves (12), is equal to that of the support elements and the guide and slide elements.

5 Claims, 5 Drawing Sheets

DEVICE FOR PRODUCING CROSS-FINNED PIPES

BACKGROUND OF THE INVENTION

The invention concerns an apparatus for the production of transversely ribbed tubes, with mold jaw halves which bear against each other along a common mold section with front faces, and form a mould passage.

An apparatus of that kind is known for example from German published specification (DE-AS) No 20 65 048. Along the common mold section, that apparatus has a stationary base plate which is provided with holes for the passage of a cooling agent through cooling passages provided in the mold jaw halves, and with vacuum holes which are in flow communication along the common mold section with vacuum passage which are provided jointly with the cooling passages in the mold jaw halves. The mold jaw halves are also guided along guide devices which are not described in greater detail.

A similar apparatus for the production of transversely ribbed tubes is known from EP 0 065 729 A1.

An apparatus of the kind set forth in the opening part of this specification is also known for example from German laid-open application (DE-OS) No 27 53 297 or U.S. Pat. No. 3,981,663.

The object of the present invention is to provide an apparatus of the kind discussed above, in which the mold jaw halves are of relatively low weight and are cooled in the optimum fashion, while insuring precise guidance for the mold jaw halves.

SUMMARY OF THE INVENTION

In accordance with the invention, in an apparatus of the kind discussed above, that object is attained in that each mold jaw half is connected at a first surface to a support element guided along a first linear guide device and at a second surface which is opposite to the first surface it is connected to a guide and slide element which is guided along a second linear guide device which is parallel to the first linear guide device, that the support element and the guide and slide element comprise the same material, that the associated mold jaw half comprises a material of relatively specific weight which has a high coefficient of expansion and a high coefficient of thermal conduction, and that the longitudinal extent of the mold jaw halves and the support elements and the guide and slide elements in the direction of the mold section are adapted to each other, with adaptation to the coefficient of expansion of the material of the mould jaw halves and the coefficient of expansion of the material for the support elements and the guide and slide elements, in such a way that the longitudinal dimensions of the mold jaw halves, the support elements and the guide and slide elements are equal at the operating temperature of the mold jaw halves.

In the apparatus according to the invention the first and the second surfaces of the mold jaw halves are preferably oriented horizontally and the front faces are oriented perpendicularly. The guide and slide elements are desirably fixed to the support elements. That fixing can be effected for example by screw connections. The mold jaw halves are preferably connected to the support elements by means of quick-action clamping devices so that it is possible in a simple manner, without involving a great deal of time, to replace existing mold jaw halves by other mold jaw halves in order to use the apparatus to produce transversely ribbed tubes of given dimensions.

The first linear guide device and the second linear guide device which is disposed in parallel relationship to the first linear guide device and along which the support elements of the mold jaw halves are linearly movably guided afford a good guidance action for the mold jaw halves, and that has a positive effect on the speed of forward movement of the mold jaw halves. A relatively high speed of forward movement of the mold jaw halves can also be achieved in particular if each mold jaw half has a cooling passage for a cooling agent, and if the first linear guide device has an elongate central cooling agent circulation portion which is in fluid communication through the associated support element with the cooling passage of the respective mold jaw half and, laterally therebeside, two elongate oil-lubricated guide portions. Such a design configuration for the apparatus affords the advantage that the cooling agent effectively flows through the mold jaw halves along the common mold section, thus affording good positive cooling for the mould jaw halves. That good cooling action for the mould jaw halves makes it possible for the forward speed movement of the mould jaw halves to be correspondingly increased, thus resulting in a correspondingly high level of productivity of the apparatus according to the invention. That is also achieved in particular by virtue of the fact that, in accordance with the invention, the mould jaw halves comprise a material of relatively low specific weight. That material may be for example aluminum. The support elements and the guide and slide elements comprise for example high-quality steel.

In the apparatus in accordance with the invention, each mould jaw half may have vacuum passages which are in flow communication with the mould passage and which open out of the guide and slide elements by means of vacuum communication channels which are provided in the front faces of the mould jaw halves and in the associated guide and slide elements and which form vacuum communication passages along the common mould section. With such a design configuration of the last-mentioned kind, there can be provided, along the mould section, a vacuum bar or rail which is elastically yieldingly mounted to a stationary vacuum head and against which the guide and slide elements of the corresponding jaw halves sealingly bear. In that case, the vacuum bar or rail is associated with the second linear guide device and is disposed in parallel relationship therewith. In addition, the elastically yielding arrangement of the vacuum bar or rail makes it possible to compensate for dimensional tolerances and variations in dimensions which are caused by thermal expansion, and this also has a positive effect on the speed of forward feed movement of the mould jaw halves and thus the level of productivity of the apparatus according to the invention.

BRIEF DESCRIPTION OF THE DRAWINGS

Further details, features and advantages will be apparent from the following description of an embodiment, illustrated in the drawings, of the apparatus in accordance with the invention for the production of transversely ribbed tubes, or essential details thereof. In the drawings.

DETAILED DESCRIPTION OF PREFERRED EMBODIMENTS

Figure 1:
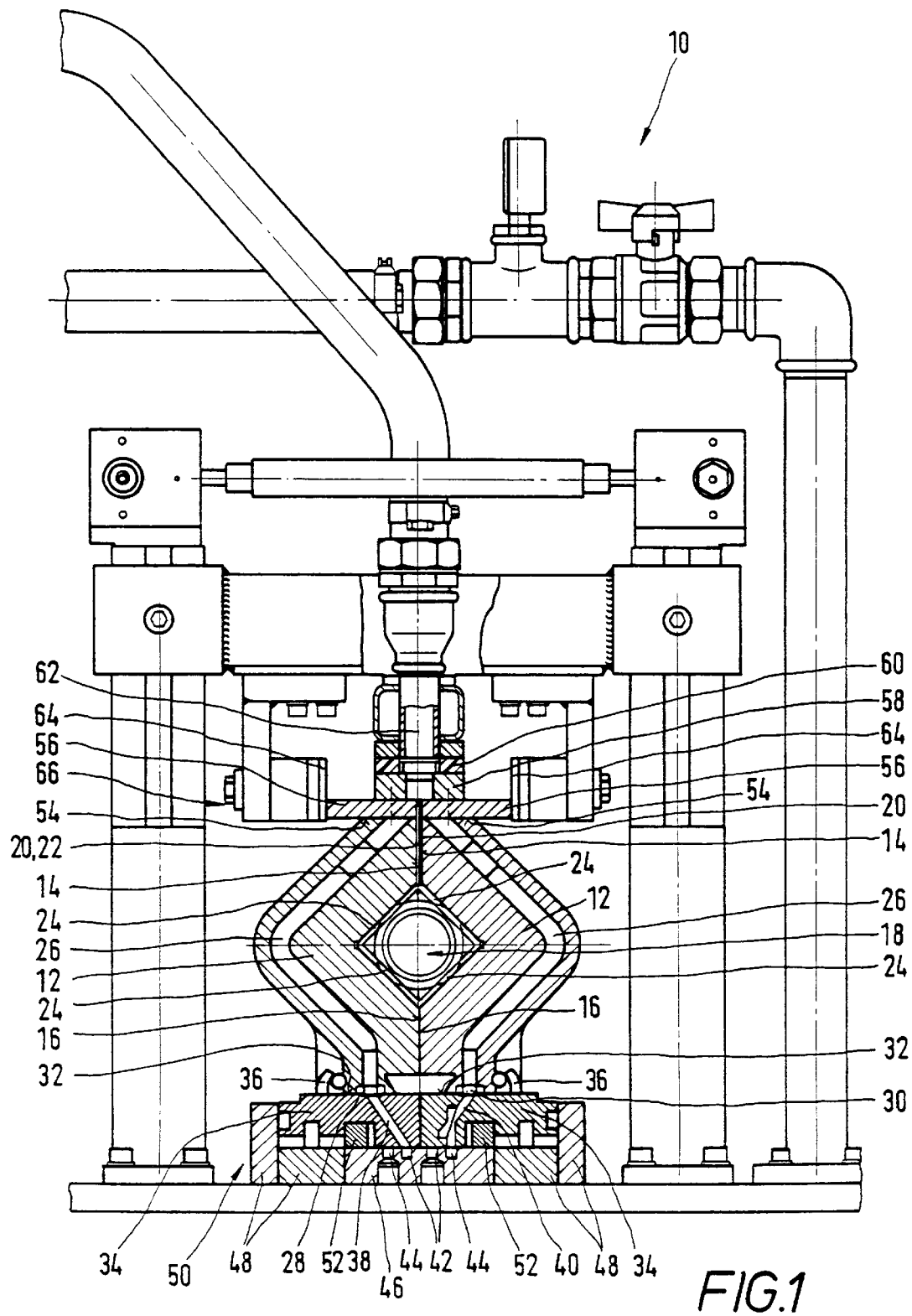
FIG. 1 is a partly sectional front view of an embodiment of the apparatus.
Figure 3:
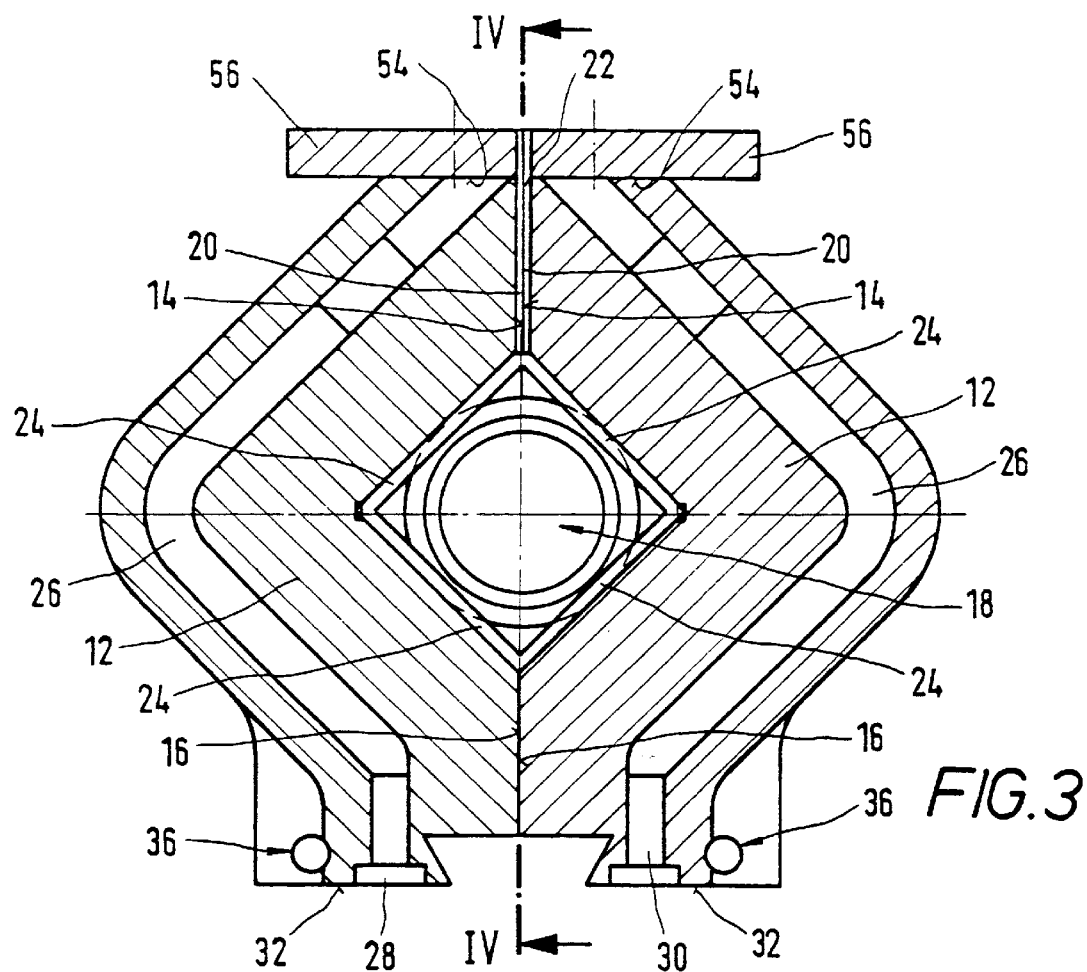
FIG. 3 is a view taken along section line III—III in FIG. 2 through the two mold jaw halves and the associated guide and slide elements.
Figure 2:
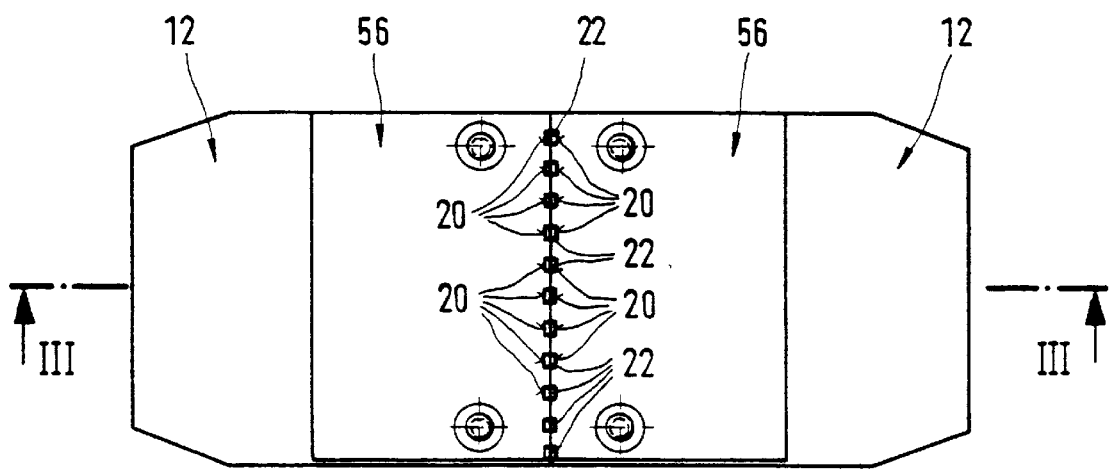
FIG. 2 is a view from above in section through two mold jaw halves in combination with the associated guide and slide elements at the common mold section.
Figure 4:
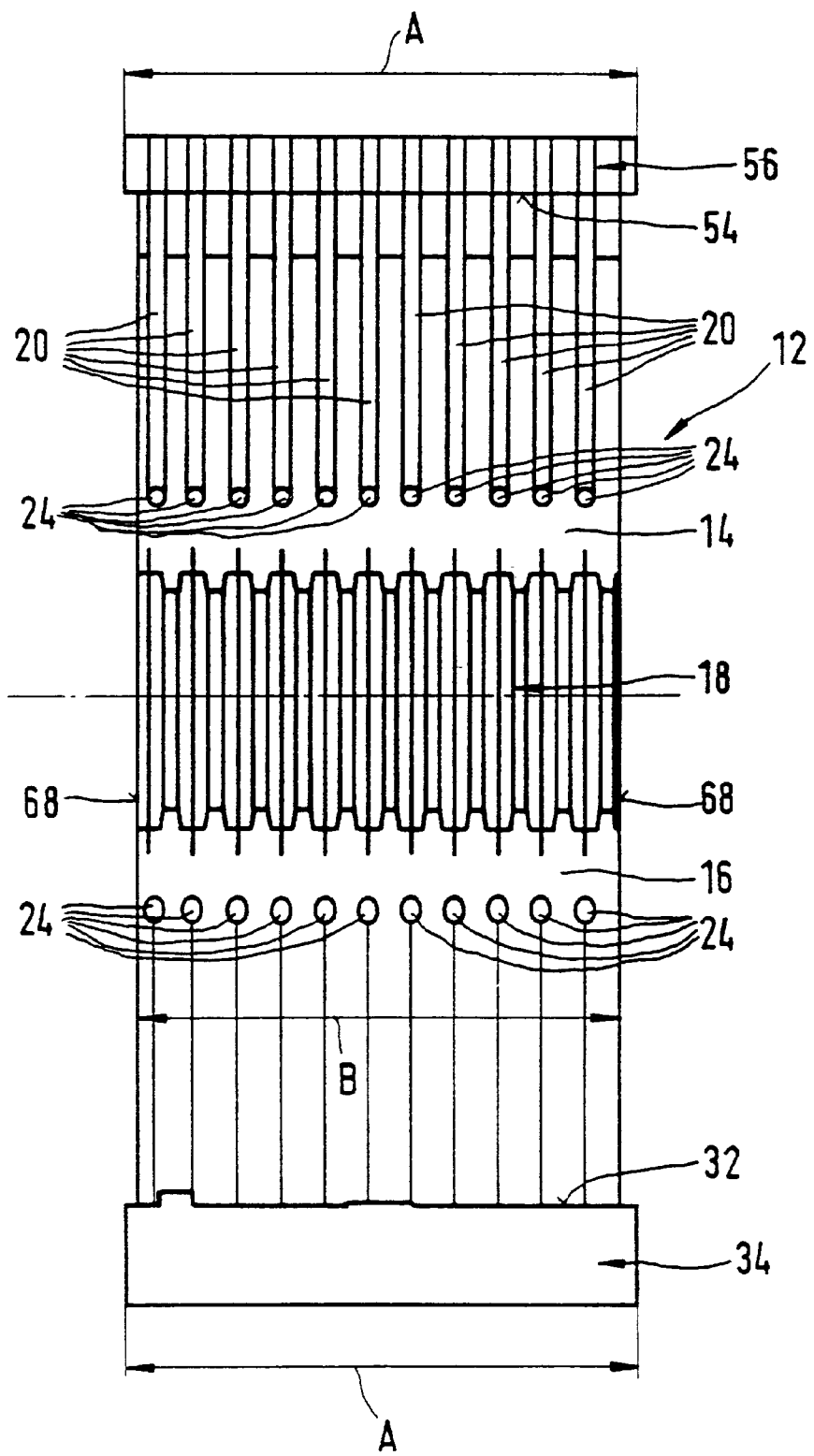
FIG. 4 is a view in section taken along section line IV—IV in FIG. 3.
Figure 5:
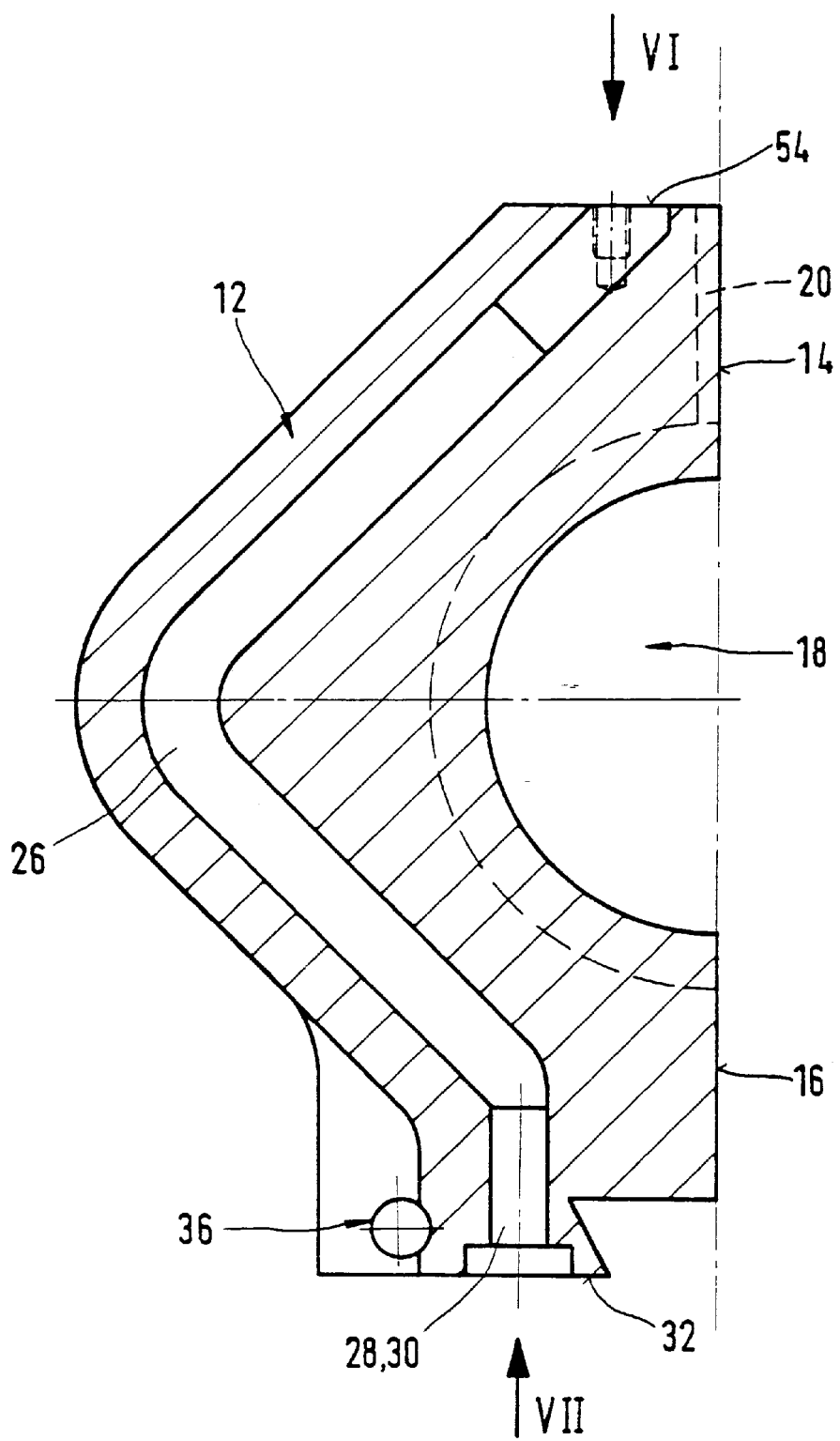
FIG. 5 is a view in section through a casting blank of a mold jaw half.
Figure 6:
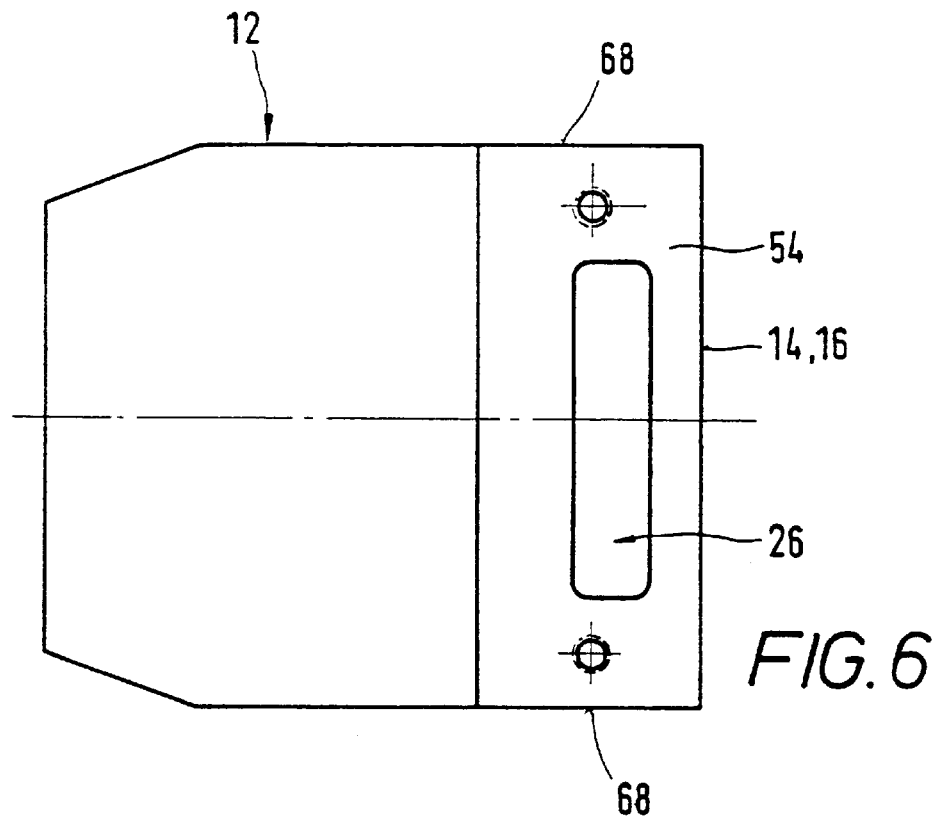
FIG. 6 is a view of the casting blank of the mold jaw half as shown in FIG. 5 viewing in the direction of the arrow VI, that is to say viewing from above.
Figure 7:
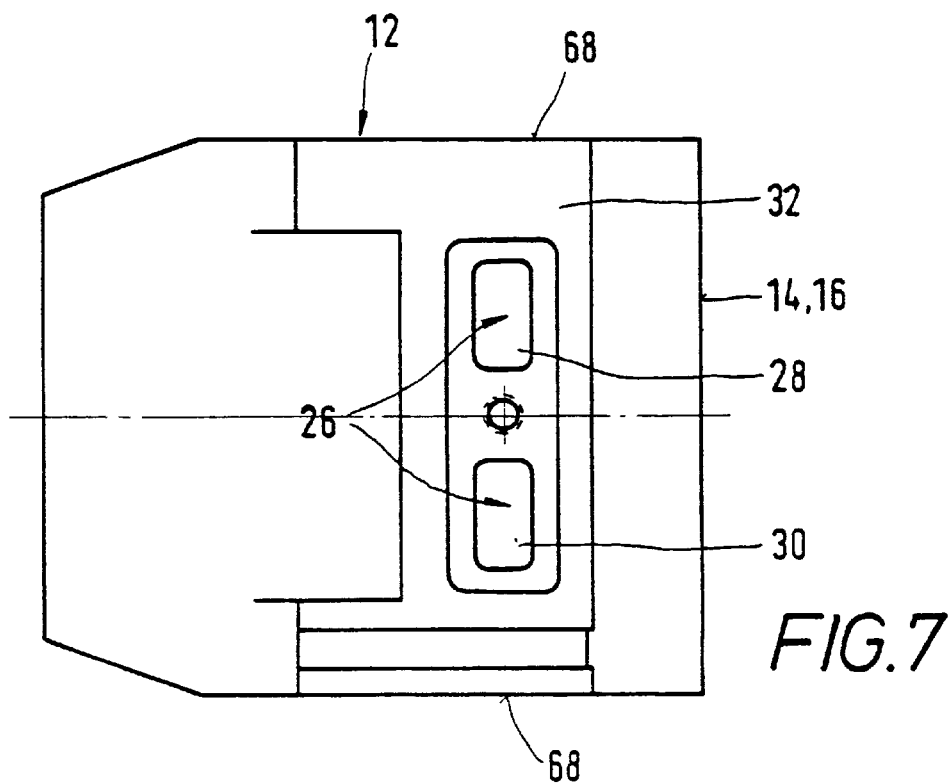
FIG. 7 is a view in the direction of the arrow VII in FIG. 5, that is to say viewing from below.

Referring to FIG. 1, shown therein is a partly sectional front view of an embodiment of the apparatus 10 for the production of transversely ribbed tubes, having mold jaw halves 12 which are illustrated at the common mold section along which the mould jaw halves 12 bear against each other with their front faces 14 and 16, and form a mold passage 18.

As can be seen from FIGS. 1, 2, 3 and 4 the front faces 14 of the mold jaw halves 12 are provided with vacuum communication channels 20 which form vacuum communication passages 22 when the mold jaw halves 12 are disposed at the common mould section of the apparatus 10. The vacuum communication passages 22 are in flow communication with vacuum passages 24 which are formed in the mold jaw halves 12 in such a way that they open into the mold passage 18.

The mold jaw halves 12 are also provided with cooling passages 26 which each have a respective cooling agent feed means 28 and a respective cooling agent discharge means 30. The cooling agent feed means 28 and the cooling agent discharge means 30 of each mold jaw half 12 is provided at a first surface 32 of the respective mould jaw half 12. The mould jaw halves 12 bear with their first surface 32 against a respectively associated support element 34. They are fixedly connected to the associated support element 34 by means of a quick-action clamping device 36. Extending through each support element 34 is a communication passage 38 which is associated with the cooling agent feed means 28, and a communication passage 40 which is associated with the cooling agent discharge means 30. The communication Passage 38 opens into a cooling agent feed channel 49 and the communication passage 40 opens into a cooling agent discharge channel 44. The two cooling agent feed channels 42 for the mutually oppositely disposed mold jaw halves 12, and the two cooling agent discharge channels 44, are provided at the top side of an elongate central cooling agent circulation portion 46. The cooling agent circulation portion 46 preferably comprises a sliding or bearing metal alloy in order to minimize the friction between it and the support elements 34 of the mold jaw halves 12.

Laterally adjoining the central elongate cooling agent circulation portion 46 are elongate oil-lubricated guide portions 48 which, jointly with the central cooling agent circulation portion 46, form a first linear guide device 50 for the mold jaw halves 12, by way of the support elements 34.

In order reliably to prevent lubricating oil from being transferred from the two lateral oil-lubricated guide portions 48 to the central elongate cooling agent circulation portion 46, the apparatus has separating bars or rails 52 which are arranged between them.

At its side which is remote from the first surface 32, each mold jaw half 12 has a second surface 54. Fixed to the second surface 54 of each mold jaw half 12 is a guide and slide element 56 by which the cooling passage 26 of the respective mold jaw half 12 is sealingly closed at the second surface 54.

The vacuum communication channels 20 at the front face 14 of the mold jaw halves 12 also extend through the guide and slide elements 56 so that the vacuum communication passages 22 which are formed by the vacuum communication channels 20 along the common mold section also extend, along the common mold section, through the guide and slide elements 56, and open into a vacuum bar or rail 58 which is provided at the common mold section. The vacuum bar or rail 58 is elastically yieldingly connected by way of an elastic intermediate element 60 to a stationary vacuum head 62 so that it is possible to compensate for mechanical tolerances in respect of height and variations in dimensions which are caused by thermal expansion.

The guide and slide elements 56 are linearly movably guided on guide members 64 which form a second linear guide device 66.

The guide and slide elements 56 and the support elements 34 comprise the same material, for example high-quality steel. The mold jaw halves 12 comprise a material of relatively low specific weight, for example aluminum, which has a high coefficient of expansion in comparison with the coefficient of expansion of the material for the support elements 34 and for the guide and slide elements 56. The material for the mold jaw halves 12 has in particular a relatively high coefficient of thermal conduction in order to provide for good thermal conduction from the cooling agent in the cooling passages 26 to the mold passage 18 of the mold jaw halves 12 which are disposed at the common mold section, thereby to provide for a good positive cooling effect. So that the mold jaw halves bear closely against each other with their base surfaces 68 (see FIG. 4) along the common mold section, the support elements 34 and the guide and slide elements 56 are of a longitudinal extent A in the direction of the common mold section and the mold jaw halves 12 are of a longitudinal extent B in the direction of the common mould section, wherein the following applies:

$$A(To)\cdot(1+\alpha_A\cdot T)=B(To)\cdot(1+\alpha_B\cdot T)$$

with: A (To)=longitudinal extent of the support element 34 and the guide and slide element 56 at ambient temperature, B (To)=longitudinal extent of the mold jaw half 12 at ambient temperature To, $\alpha_A$ coefficient of thermal expansion of the material for the support element 34 and for the guide and slide element 56, $\alpha_B$ coefficient of thermal expansion of the material for the mold jaw half 12

To=ambient temperature

T=operating temperature.

In FIGS. 1 to 7 the same items are each denoted by the same reference numeral so that there is no need for all features to be described in detail in relation to all those Figures.

What is claimed is:

1. Apparatus for the production of transversely ribbed tubes, comprising:

mold jaw halves which bear against each other along a common mold section with front faces thereof and which form a mold passage therebetween, wherein said common mold section has a first surface thereof and a second surface thereof remote from and in opposite relationship to said first surface;

wherein each mold jaw half is connected at said first surface to a support element, with said support element guided along a first linear guide device;

wherein each mold element is connected at said second surface to a guide and slide element, which guide and slide element is guided along a second linear guide device which is parallel to the first linear guide device;

with the support element and the guide and slide element comprising the same material, and with the mold jaw halves comprising a material of specific weight which is low in comparison with the material for said support element and for said guide and slide element, and with the mold jaw halves having a coefficient of expansion and thermal conductivity high in comparison with the coefficient of expansion and thermal conductivity of said support element and said guide and slide element; and wherein the longitudinal extent of each mold jaw half and the longitudinal extent of each support element and guide and slide element in the direction of said mold section, the coefficients of expansion of the material for the support elements and guide and slide elements, the coefficient of expansion of the mold jaw halves, the ambient temperature and an operating temperature are related as:

$$A(T_0) \cdot (1+\alpha_A T) = B(T_0) \cdot (1+\alpha_B T)$$

wherein A is the longitudinal extent of the support element and the guide and slide element, $\alpha_A$ is the coefficient of thermal expansion of the material for the support element and for the guide and slide element, B is the longitudinal extent of the mold jaw halves, $\alpha_B$ is the coefficient of thermal expansion of the material for mold jaw halves, $T_0$ is the ambient temperature, and T is the operating temperature.

2. Apparatus according to claim 1, wherein each mold jaw half is connected to a support element by a clamping device.

3. Apparatus according to claim 1, wherein each mold jaw half is provided with a cooling passage for a cooling agent, and wherein the first linear guide device has an elongate central cooling agent circulation portion which is in fluid communication through a support element with the cooling passage of the respective mold jaw half, and including two elongate oil-lubricated guide portions laterally of said elongate central cooling agent circulation portions.

4. Apparatus according to claim 1, including:

vacuum communication passages provided in the front faces of the mold jaw halves and in guide and slide elements; and vacuum passages in each mold half which open out of the guide and slide elements by said vacuum communication passages and which are in flow communication with said mold passage.

5. Apparatus according to claim 1, including a vacuum rail provided along the mold section, wherein said vacuum rail is elastically mounted to a stationary vacuum head, and wherein said guide and slide elements of the corresponding mold jaw halves sealingly bear against said vacuum rail.

* * * * *